United States Patent [19]
Moore et al.

[11] Patent Number: 6,065,347
[45] Date of Patent: *May 23, 2000

[54] METHOD AND MEANS FOR MEASURING DYNAMIC AND STATIC AIR PRESSURE ON A GROUND SURFACE BENEATH A NEGATIVE AIR SYSTEM

[75] Inventors: Matthew D. Moore, Dubuque; Ambar K. Mitra, Ames; J. Adin Mann, III, Ames; Jerald Vogel, Ames, all of Iowa

[73] Assignee: Iowa State University Research Foundation, Inc., Ames, Iowa

[ * ] Notice: This patent is subject to a terminal disclaimer.

[21] Appl. No.: 09/300,706

[22] Filed: Apr. 27, 1999

Related U.S. Application Data

[63] Continuation of application No. 09/030,464, Feb. 25, 1998, Pat. No. 5,929,339.

[51] Int. Cl.⁷ .......................................... G01L 7/00
[52] U.S. Cl. .............................................. 73/756
[58] Field of Search ........................ 73/756, 147

[56] References Cited

U.S. PATENT DOCUMENTS 4,188,823  2/1980  Hood ........................................ 73/147
5,929,339  7/1999  Moore et al. ............................. 73/756

Primary Examiner—Joseph L. Felber
Attorney, Agent, or Firm—Zarley, McKee, Thomte, Voorhees & Sease

[57] ABSTRACT

A method of measuring dynamic air pressure on a ground surface beneath a negative air system which is comprised of a rotatable negative air pressure element with a deck unit having a top with side walls and an open bottom involves placing the system on an elevated horizontal platform located in spaced relation to the deck. The system is then made operative. Measurements are then made of the air pressure at a plurality of locations adjacent the platform to determine if the air pressure at such locations is such that predetermined values are met. The apparatus for performing the aforesaid method has a horizontal platform with a plurality of apertures therein. The platform is adapted to support the negative air system. A plurality of air pressure sensors are mounted in spaced locations on the platform and are located in the lower end of hollow extending tubular pressure taps. The sensors are operatively connected to a monitor to permit the dynamic air pressure to be read adjacent each aperture when the operating negative air system is placed on the platform over the apertures.

11 Claims, 5 Drawing Sheets

METHOD AND MEANS FOR MEASURING DYNAMIC AND STATIC AIR PRESSURE ON A GROUND SURFACE BENEATH A NEGATIVE AIR SYSTEM

This application is a continuation of Ser. No. 09/030,464 filed Feb. 25, 1998 now U.S. Pat. No. 5,929,339.

BACKGROUND OF THE INVENTION

There is a current need by lawn mower manufacturers for an experimental method of evaluating lawn mower blade performance. Performance has typically been measured in how well the grass is cut which was determined by visually observing the amount of grass cut or the quality of grass cut. Poor cutting performance results in a phenomena known as "streaking", "patching" and "stragglers". Streaking means that regions of grass that the mower passes over are not cut by the blades. In addition, the increased sound emitted by poorly designed blades is a cause of concern. No existing prior art method achieve a satisfactory way of analyzing blade performance to optimize the desired results of excellent grass cutting with minimum sound emission.

It is therefore a principal object of this invention to provide a method and apparatus for measuring dynamic and static air pressure on a ground surface beneath a lawn mower system to permit the cutting blade and or the deck housing the blade to be configured to optimize grass cutting and to reduce sound emissions.

A further object of this invention is to permit such testing to be effective on mowers with one or more cutting spindles.

A still further object of this invention is to permit such testing to be easily, and quickly, and accurately conducted.

These and other objects will be apparent to those skilled in the art.

SUMMARY OF THE INVENTION

Typically, lawn mower blades interacting with the deck lift grass off the ground by creating a vacuum between the spinning mower blades and the earth. The premise of this invention is that the lawn mower blade performance is directly related to the magnitude of this vacuum and the direction of the resulting flow that is drawn in from the outside of the lawn mower deck.

A method of measuring dynamic air pressure on a ground surface beneath a lawn mower system which is comprised of a rotatable horizontal blade with a deck unit having a closed top with side walls and an open bottom involves placing the mower on an elevated horizontal platform located in spaced relation to the deck. The blade is then rotated at a speed at which the blade normally would cut grass. Measurements are then made of the air pressure at a plurality of locations adjacent the platform to determine if the air pressure at such locations is such that a blade of grass at each location would be lifted or depressed with respect to the platform.

The apparatus for performing the aforesaid method has a horizontal platform with a plurality of apertures therein.

The platform is adapted to support a lawn mower deck with a rotatable horizontal blade mounted therein. A plurality of static pressure taps, hollow tubes, are mounted in spaced locations on the platform. Hollow vinyl tubing connects the taps to ports on a scanning pressure transducer. The ports are operatively connected to a monitor to permit the dynamic air pressure to be read adjacent each aperture when a lawn mower with a deck and a rotating blade within the deck is placed on the platform over the apertures.

DESCRIPTION OF THE PREFERRED EMBODIMENT

Figure 1:
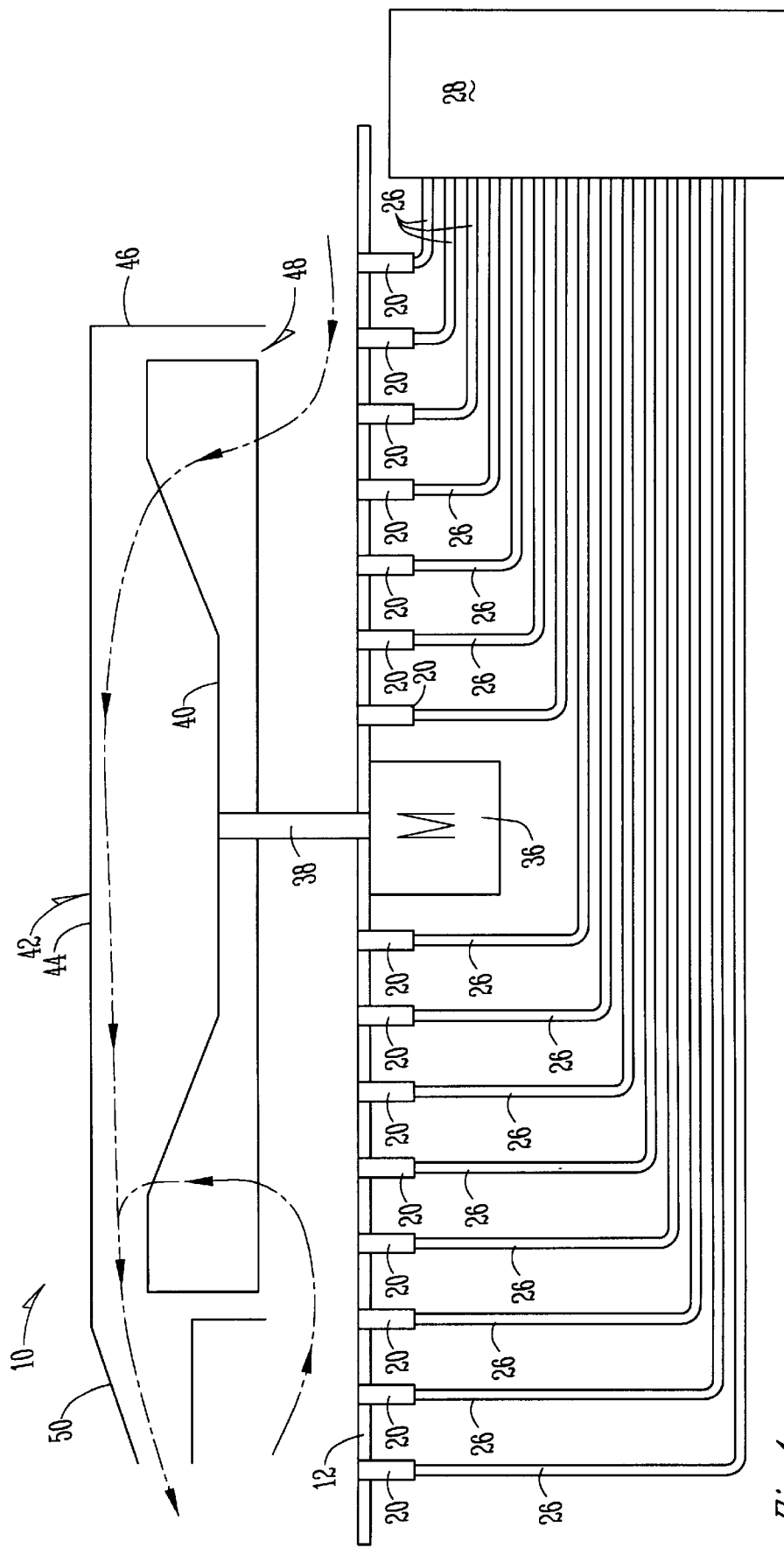
FIG. 1 is a cross sectional view of the device of this invention.
Figure 2:
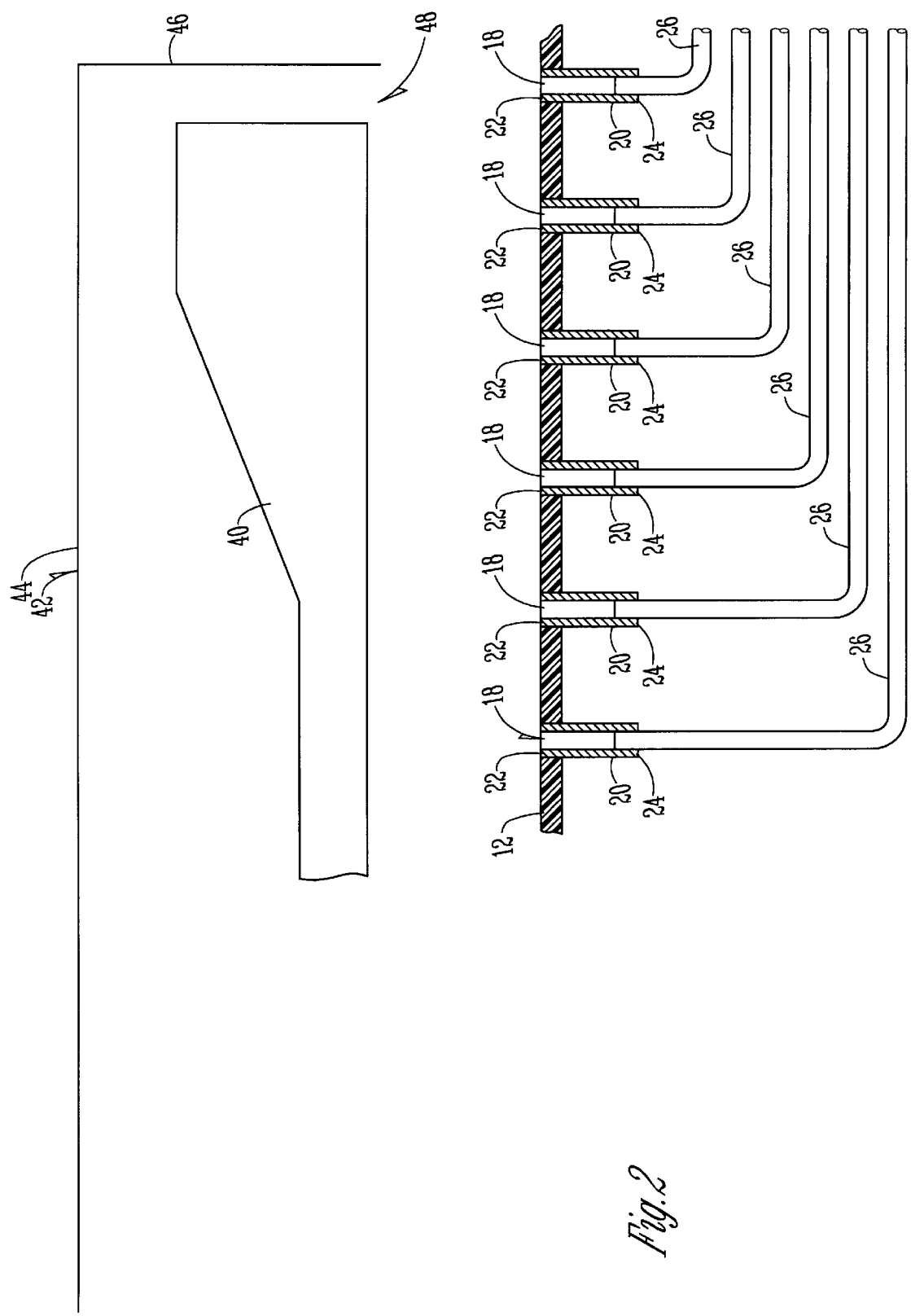
FIG. 2 is a partial cross sectional view of the device of this invention shown at an enlarged scale.

The numeral 10 designates the testing device of this invention which has a horizontal platform 12 which is supported by short legs 14 at least a few inches above a floor surface 16 or the like.

A plurality of spaced apertures 18 extend vertically through platform 12. A plurality of vertically disposed hollow pressure tap tubes 20 are mounted by their upper ends 22 in each of the apertures 18. Tubes 20 extend downwardly from platform 12 and terminate in lower end 24.

Figure 3:
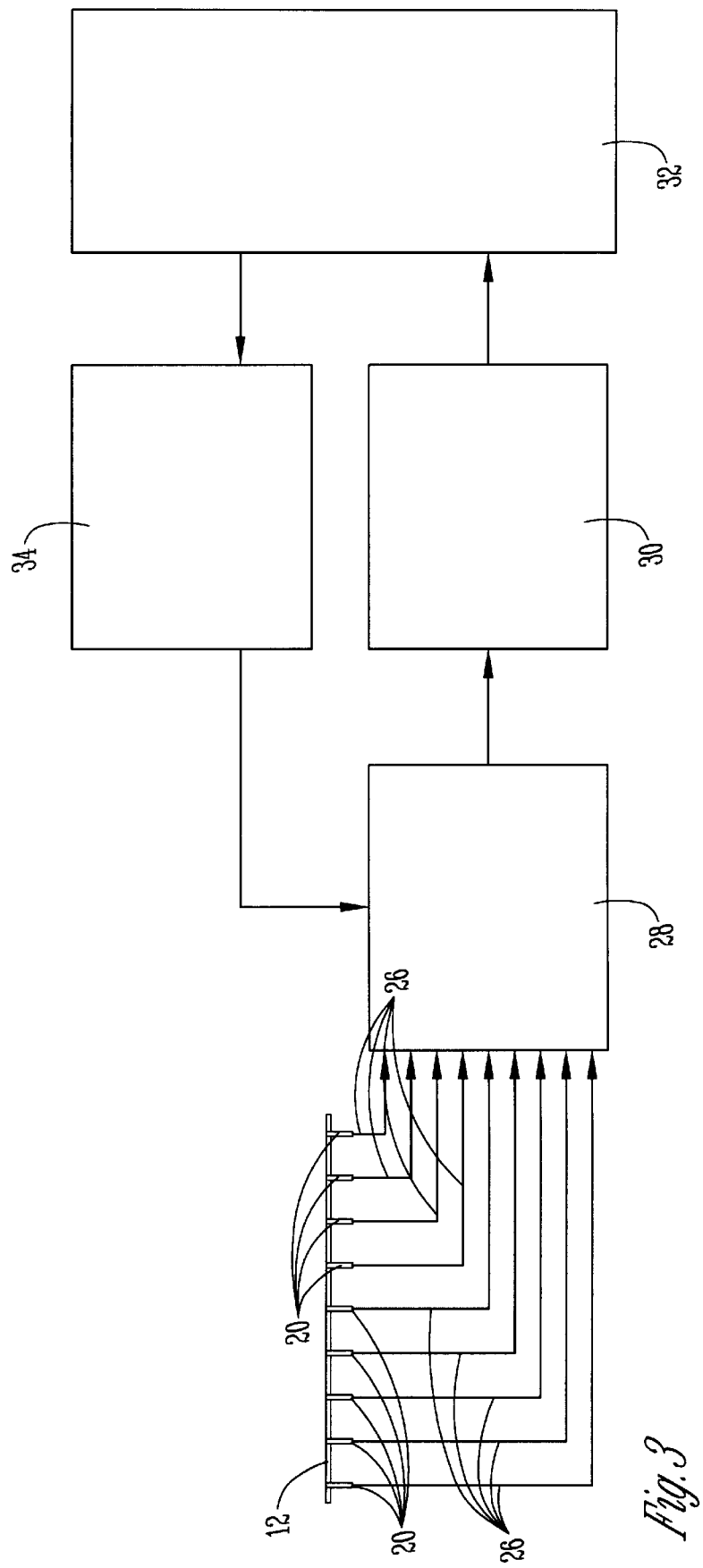
FIG. 3 is a block diagram of the data acquisition system of this invention.
Figure 4:
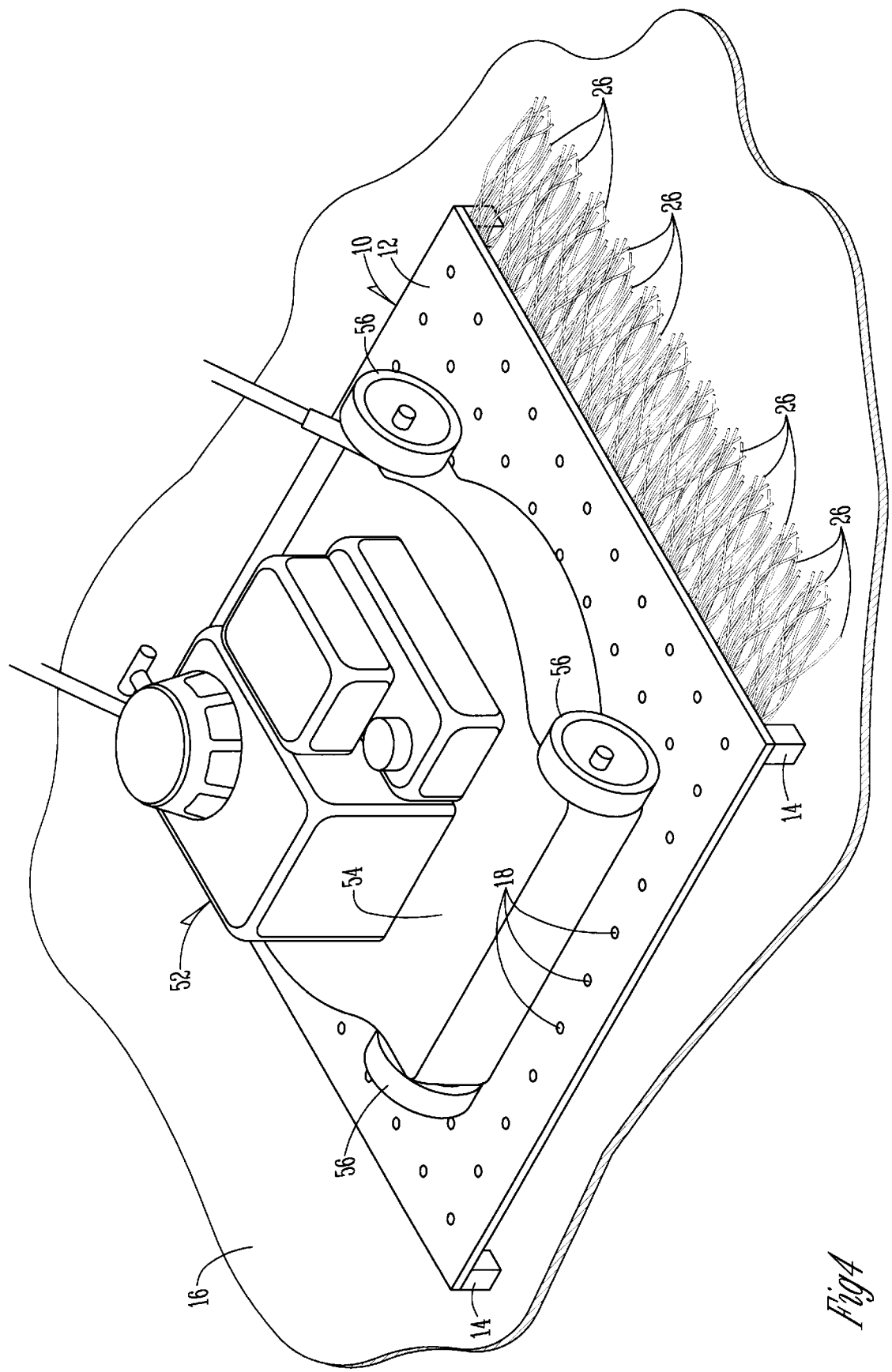
FIG. 4 is a partial perspective view of a lawn mower being tested on the platform of this invention.

A plurality of flexible elongated vinyl nylon tubes 26 are frictionally or otherwise secured to the bottom ends of tubes 20 and extend to scanivalve 28 (FIG. 3). Scanivalve 28 is operationally connected to the signal conditioning and amplifier 30 which in turn is operationally connected to computer 32. The computer 32 is operationally connected to the scanivalve controller 34 which in turn is connected back to the scanivalve 28. The arrows in FIG. 3 designate the sequential interconnection among the components 28–34.

The platform 12 is preferably and approximately 75 inches long by 48 inches wide, but can be fit to the size of a particular lawn mower, and is one quarter of an inch thick.

It is comprised of a high density particle board. The pressure tap tubes 20 are approximately an inch long and are cut from standard wall 19 gauge (1.0922 mm OD) stainless steel hypodermic tubing stock. As previously indicated, the upper ends of the tubes 20 are embedded into apertures 18 which are drilled with a 1.0414 mm (0.041 inch) diameter drill bit and secured therein with epoxy.

As previously indicated, the lower ends of tubes 20 are connected to scanivalve 28 which is a scanning pressure transducer. This interconnection is effected with the vinyl or nylon tubing 26 which has an internal diameter of 1.016 mm (0.040 inches). The tubes 20 are preferably comprised of stainless steel. The tubing 26 is bent horizontally-to the scanivalve 28. The horizontal portions of the tubes 26 are positioned approximately 2 cm from the bottom of the platform 12. The legs 14 provide for sufficient spacing under the platform 12 to prevent crimping of the taps or tubing.

The elevation of platform 12 above the floor surface 16 could also be accomplished by affixing strips of wood to the under side of three sides of the platform with the strips of wood being of sufficient dimensions to achieve the desired spacing of the horizontal portions of the vinyl tubing underneath the bottom surface of the platform.

The scanivalve 18 is a Scanivalve Corp 48S2-153 Model. It is coupled to a +/−1.0 psid pressure transducer. This conventional type of instrument is able to measure the pressure at 48 individual locations represented by apertures 18. An internal solenoid (not shown) actuated by the controller 34 "steps", or rotates a rotor (not shown) that exposes each individual port to the transducer as directed by suitable software. Therefore, by connecting the nylon tubes 26 to 48 tap tubes 20 in the manner indicated, the scanivalve 28 can be used to measure the pressure at each of the tubes 20.

As seen in FIG. 1, an electric motor 36 is mounted to the underside of platform 12 in any convenient way and has an upwardly extending spindle 38 extending therefrom. The lawn mower blade 40 to be tested is secured in any conventional way to the upper end of spindle 38. The lawn mower deck 42 to be tested in conjunction with the blade 40 is mounted in any convenient manner over the blade 40 to assume a conventional position with respect to the blade 40. Deck 42 has closed top 44, closed vertical sides 46, open bottom 48 and a grass discharge chute 50. This structure is conventional and represents a typical lawn mower deck and blade to be tested.

The basis of the performance parameters in using device 10 is the lifting force applied to blades of grass under the deck 42:

1) blade lift is defined for as the average vacuum pressure at the ground surface of platform 12 below the deck 42.
2) lift distribution is defined as the vacuum pressure as a function of position below the deck 42.

These performance parameters are estimated by measuring the dynamic air pressure on the ground (platform 12) surface below the deck 42. This is done by imbedding over 2,000 pressure taps 20 in a 130 cm by 100 cm array into a simulated ground surface represented by platform 12. A scanning transducer is used to measure the pressure at each individual tap or tube 20. Measuring the pressure at 44 locations is normally sufficient to defining the blade lift, but this number can be varied depending on the deck size. However, there can be applications where a finer resolution is needed, especially in the case of studying the lift distribution.

The blade lift is then calculated by averaging the vacuum pressure measured at each position (i.e. taps 20), and the lift distribution is examined by plotting the measured vacuum pressure as a function of position under the deck 42.

In testing, the motor 36 can be energized by any suitable control means (not shown) to simulate the rotation of the blade 40 within the deck 42 under actual grass cutting conditions.

In lieu of using the motor 36 and spindle 38, a conventional lawn mower 52 having a conventional deck 54 can be placed on platform 12 and supported in elevated position by conventional wheels 56. The mower 52 has a conventional blade such as blade 40 to be tested and is powered conventionally by a conventional motor on the mower 52.

At the beginning of a test sequence, a source code determines the number of pressure tap tubes to be scanned, the scan rate, the number of samples per channel, etc. The scan rate is how many times per second the data acquisition card records a digital voltage output from the scanivalve. The samples per channel is how many readings are acquired per tube 20. At the end of each sequence, the average of all the digital readings is stored in a file in computer 32 as the average voltage for that location. The voltage at each location is averaged for approximately 1.5 seconds. This amount of time is deemed acceptable because under normal operation the mower 52 is not stationary, but rather moves along the ground at a finite speed.

After all of the information is entered, the program of computer 32 instructs the data acquisition card (National Instruments Lab, PC+) to prompt the scanivalve controller 34 (Model CTLR 10 P/s2-s6) to step the scanivalve through its programmed sequence. The signal that is generated by the scanivalve 28 passes through a Vishay Instruments signal-conditioning amplifier 30 (Model 2310), and is sent back to the data acquisition card. Other equipment can be used to accomplish the same result.

Figure 5:
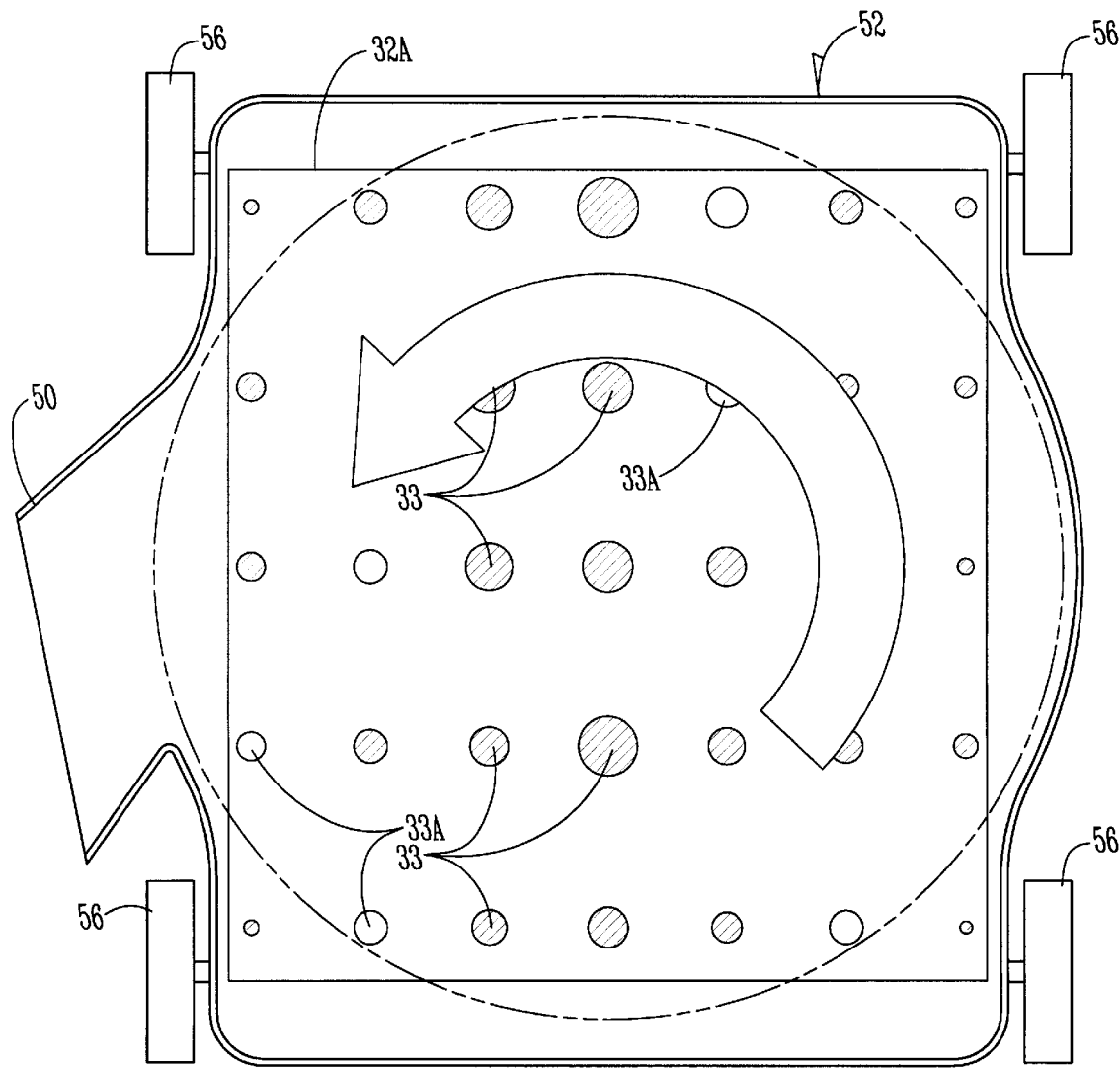
FIG. 5 is a schematic plan view showing variations in air pressure at different locations on the platform of this invention as viewed on a computer screen.

A plot of the data received takes place within the outline of the mower decks 42 or 54. An in-house fortran program associated with computer 32 can be used to impart the data file created by the Quick Basic data acquisition code to assign each pressure measurement at each location to a Cartesian coordinate under the deck. This will permit the output at each location to be formatted so that the relative magnitude of the pressure measured by the scanivalve can be seen to change literally with the diameter of dots imposed on the computer screen 32A (FIG. 5). Darker dots 33 will represent negative (suction) gauge pressures, while lighter dots 33A will represent positive (downwash) gage pressures.

Greater sound emissions, as discussed above, tend to be emitted from locations where downwash phenomenon exist. Sound power can be measured at the upper surface of platform 12 in accordance with ANSI 12.36-1990 Standard Survey Methods for the Determination of Sound Power Levels of Noise Sources. Suitable microphones (e.g., ACO Pacific ½" microphones Model 40112) located at approximately a one meter radius from the location to be tested can be connected to a suitable data acquisition system (not shown) to provide the magnitude of the sound power, $L_w$ by averaging the sound pressure $L_{pi}$ according to the following equation:

$$L_w = 10\log_{10}\left[\frac{1}{10}\sum_{i=1}^{10} 10^{\left(\frac{L_{pi}}{10}\right)}\right] + 10\log_{10}\left(\frac{S}{S_O}\right)$$

Where $S_o = 1$ m². S=the surface area of the measurement surface.

By visually determining the magnitude of pressure at the locations of apertures 18, it can be visually seen on the data screen 32A (FIG. 5) where the locations of higher or lower pressure are located. By comparing this data with the configuration primarily of the blade being tested, the portions of the blade creating the various pressures can be ascertained. This enables the blade designer to change the configuration of the blade at a position, for example, to avoid a downwash of air detrimental to the desirable cutting phenomenon which also can be expected to be the location of higher sound emissions. The operator is also able to use the same information to measure the effect of blade-deck interaction, for the ultimate design may lie in the deck configuration as well as the blade configuration.

From the foregoing, it is seen that the testing method and device of this invention is useful in determining air pressures at a variety of locations within the deck of the mower being tested which also allows the testing of air pressure at locations between decks having multiple spindles and blades.

From the foregoing it is seen that this invention will achieve at least all of its stated objectives.

What is claimed is:

1. A method of measuring dynamic air pressure and its effects on a horizontal surface beneath a negative air system of a normally wheel-supported unit having a deck unit with a top, sidewalls, and a bottom spaced from and in dynamic air communication with the horizontal surface, and a movable negative air pressure producing element in communication with the deck unit adapted to move air generally upwardly and away from the horizontal surface, comprising, placing the deck unit adjacent an elevated horizontal platform having a horizontal surface in a spaced distance from the horizontal surface substantially equal to the space normally existing when the wheel supported unit is supported on a horizontal plane, energizing the movable negative air pressure producing unit typical of its normal operational mode, measuring the air pressure at a plurality of locations adjacent the platform underneath the deck to determine the negative air lifting capacity at each location with respect to the platform.

2. The method of claim 1 wherein the measuring of air pressure comprises associating an air pressure sensor means with each location, and reading the indicated air pressure from each location.

3. The method of claim 1 wherein the measuring of air pressure further comprises placing a plurality of hollow open-ended tubes in a downwardly extending direction through said platform at each location with an upper end thereof being in communication with the air underneath said deck, and associating the air sensor means with the lower end of said tubes.

4. The method of claim 1 wherein the air pressure at approximately 44 locations are read.

5. The method of claim 1 wherein the sources of down wash noise under the deck are determined.

6. The method of claim 1 where the negative air pressure producing capability of the negative air pressure producing element is adjusted to change the air pressure at locations which are outside of predetermined parameters for useful operation of the wheel supported unit.

7. A device for measuring dynamic air pressure on a horizontal surface beneath a negative air system of a normally wheel supported unit, comprising, a horizontal platform, a negative air system of a normally wheel-supported unit on the platform having a vacuum producing element associated with a deck having an open bottom, an air pressure sensor operatively connected to spaced locations on the platform, the sensor being operatively connected to a monitoring means to permit the dynamic air pressure to be read adjacent each location when the vacuum producing element is operative.

8. The device of claim 7 wherein said platform has a plurality of apertures therein at said spaced locations.

9. The device of claim 8 wherein a pressure tap comprised of an elongated hollow tube with open upper and lower ends is mounted in each of a plurality of apertures in said platform and extends downwardly from each aperture, with said sensor being associated with the lower ends of said tubes.

10. The device of claim 9 wherein the number of said apertures is within the range of 44–2000.

11. The device of claim 7 wherein said air pressure sensor means includes means for visually depicting air pressure at said locations on a screen.

* * * * *

UNITED STATES PATENT AND TRADEMARK OFFICE
CERTIFICATE OF CORRECTION

PATENT NO. : 6,065,347
DATED : May 23, 2000
INVENTOR(S) : Matthew D. MOORE; Ambar K. MITRA; J. Adin MANN, III; and Jerald VOGEL It is certified that error appears in the above-identified patent and that said Letters Patent are hereby corrected as shown below:

Column 5, line 16, strike the numeral "1" and insert the numeral - 2 -.

Column 5, line 23, strike the numeral "1" and insert the numeral - 2 -.

Signed and Sealed this

Third Day of April, 2001

*Attest:*

NICHOLAS P. GODICI

*Attesting Officer*     *Acting Director of the United States Patent and Trademark Office*